(12) United States Patent
Pavez Aranguiz et al.

(10) Patent No.: US 7,078,448 B2
(45) Date of Patent: Jul. 18, 2006

(54) POLYMER DISPERSION WITH A CROSS-LINKING RESIN, A METHOD FOR PRODUCING THE SAME AND THE USE THEREOF

(75) Inventors: Roberto Pavez Aranguiz, Graneros (CL); Christoph Lohr, Wuppertal (DE); Hugo A. Garcia Arcos, Santiago (CL); Gerard Jakubowski, Delmenhorst (DE); Klaus Friedrich, Bad Oeynhausen (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 160 days.

(21) Appl. No.: 10/169,234

(22) PCT Filed: Dec. 21, 2000

(86) PCT No.: PCT/EP00/13089

§ 371 (c)(1),
(2), (4) Date: Mar. 5, 2003

(87) PCT Pub. No.: WO01/49788

PCT Pub. Date: Jul. 12, 2001

(65) Prior Publication Data

US 2004/0044138 A1 Mar. 4, 2004

(30) Foreign Application Priority Data

Dec. 30, 1999 (CL) .................................... 3196/99
Mar. 18, 2000 (DE) ................................ 100 13 598
Oct. 2, 2002 (DE) ................................ 100 48 867

(51) Int. Cl.
*C08L 1/26* (2006.01)

(52) U.S. Cl. ................... 524/43; 524/44; 524/502; 524/503; 524/510

(58) Field of Classification Search ................ 524/43, 524/44, 502, 503, 510
See application file for complete search history.

(56) References Cited

U.S. PATENT DOCUMENTS

| | | | | |
|---|---|---|---|---|
| 2,343,092 A | * | 2/1944 | Joseph ....................... | 524/272 |
| 5,118,430 A | | 6/1992 | Rebouillat et al. | |
| 5,190,997 A | * | 3/1993 | Lindemann et al. .......... | 524/44 |
| 5,391,608 A | * | 2/1995 | Mudge et al. ............... | 524/459 |
| 5,434,216 A | * | 7/1995 | Mudge et al. ............... | 524/803 |
| 5,439,960 A | * | 8/1995 | Mudge et al. ............... | 524/111 |
| 5,541,253 A | | 7/1996 | Dunaway et al. | |
| 5,545,684 A | | 8/1996 | Jakob et al. ................. | 524/354 |
| 5,932,647 A | | 8/1999 | Schilling et al. ............ | 524/503 |

FOREIGN PATENT DOCUMENTS

| | | |
|---|---|---|
| CL | 40634 | 5/1995 |
| CL | 2919-99 | 5/2000 |
| DE | 38 15 543 A1 | 11/1989 |
| DE | 44 28 645 A1 | 2/1995 |
| EP | 0 191 460 | 8/1986 |
| EP | 0 394 774 | 10/1990 |
| EP | 0 623 661 | 11/1994 |
| EP | 0 686 682 | 12/1997 |
| EP | 0 933 412 | 8/1999 |
| GB | 1 440 337 | 6/1976 |
| HU | P 98 00 786 A | 7/1998 |

OTHER PUBLICATIONS

Klassifizierung von Holzklebstoffenfur nichttragende Bauteile, DIN EN 204, pp. 1-4 (1997).
Napper et al., Polymerization in Emulsions, Comprehensive Polymer Science, vol. 4, Chapter 11, pp. 171-218 , Pergamon Press.
Hans-George Elias, Makromolekule, vol. 2, 5$^{th}$ Edition, pp., 93-101, Huthig & Wepf Verlag Basel (1992).
Polyesters to Polypeptide Synthesis, Encyclopedia of Polymer Science and Engineering, vol. 12, pp. 512-515, John Wiley & Sons, Inc.
Plastics, Resins, Rubbers Fibers, Encyclopedia of Polymer Science and Technology, vol. 5, pp. 801-859, John Wiley & Sons, Inc. (1966).
Methoden Der Organischen Chemie, pp. 218-268, Georg Thieme Verlag Stuttgart.
Kirk-Othmer, A To Alkanolamines, Encyclopedia of Chemical Technology, 3$^{rd}$ Edition, vol. 1, pp. 397-400, John Wiley & Sons.

* cited by examiner

*Primary Examiner*—Bernard Lipman
(74) *Attorney, Agent, or Firm*—Stephen D. Harper; Glenn E. J. Murphy

(57) ABSTRACT

The invention relates to a polymer dispersion which contains water, at least one polymer that has been produced by emulsion polymerisation, at least one protective colloid, at least one water-soluble acidic metallic salt and at least one cross-linking resin that is based on phenol-formaldehyde condensation products, hydroxymethyl-substituted imidazolidinones, such as 1,3-dimethylol-4,5-dihydroxy-imidazolidinone (4,5-dihydroxy-N,N'-dimethylolethylene urea), hydroxymethyl-substituted pyrimidinones, or hydroxymethyl-substituted triazinones or their auto-condensation products, or mixed condensates from two or more of the aforementioned compounds, or a mixture of two or more of the aforementioned compounds.

5 Claims, No Drawings

POLYMER DISPERSION WITH A CROSS-LINKING RESIN, A METHOD FOR PRODUCING THE SAME AND THE USE THEREOF

BACKGROUND OF THE INVENTION

1. Field of the Invention

This invention relates to a polymer dispersion containing water, at least one polymer produced by emulsion polymerization, at least one protective colloid, at least one water-soluble acidic metal salt and at least one crosslinking resin based on phenol/formaldehyde condensates, hydroxymethyl-substituted imidazolidinones, such as 1,3-dimethylol-4,5-dihydroxyimidazolidinone (4,5-dihydroxy-N,N'-dimethylolethyleneurea), hydroxymethyl-substituted pyrimidinones or hydroxymethyl-substituted triazinones or self-condensation products thereof or mixed condensates of two or more of the compounds mentioned or a mixture of two or more of the compounds mentioned.

The use of adhesives in the manufacture of industrial goods is increasingly replacing the use of mechanical fastenings, particularly where the connection between two workpieces is exposed to only moderate stresses. The advantages of using adhesives for establishing mechanical bonds lie in particular in the ease of using adhesives, in the possibility of joining materials continuously and, if desired, over entire surfaces and in the prodigious strength of modern adhesives as used, for example, in the furniture industry.

2. Desription of Related Art

Dispersion adhesives are commonly used in the furniture industry, being obtainable for example by emulsion polymerization of ethylenically unsaturated monomers in aqueous phase. Unfortunately, a disadvantage of dispersion adhesives is the fact that they often show poor resistance to moisture or water owing to the presence of emulsifiers and protective colloids in the aqueous dispersion.

GB-A-1,440,337, for example, describes an adhesive which is said to have a long shelf life and to be moisture-resistant. The described adhesive contains a vinyl ester polymer, polyvinyl alcohol as protective colloid, a water-soluble urea/formaldehyde resin with a relatively low degree of condensation and a water-soluble acidic metal salt. However, it is clear from the Examples of the document in question that the corresponding adhesive does not meet the requirements of modern adhesive applications in regard to water resistance.

EP-A 0 191 460 describes polymer emulsions containing polyvinyl alcohol from which coatings with improved resistance to water can be obtained. According to this document, these water-resistant polymer emulsions can be obtained, for example, by polymerizing corresponding ethylenically unsaturated monomers in the presence of polyvinyl alcohol and a redox system. The redox system has to be a nonionic redox system consisting essentially of hydrogen peroxide or an organic peroxy compound as oxidizing agent and ascorbic acid or erythorbic acid as reducing agent. However, even after crosslinking with glutaraldehyde, the described coatings do meet the requirements of DIN EN 204 D3 or D4.

EP-B 0 686 682 relates to a polyvinyl ester-based dispersion adhesive of which films show high resistance to water. An aqueous polyvinylester dispersion is used for this purpose which, besides polymeric protective colloids, contains water-soluble compounds "complexable" with the polymeric protective colloids and derivatives of polyaldehydes from which aldehyde groups can be released under control in acidic media. However, it is not proposed in the cited document to use a crosslinking resin based on phenol/formaldehyde condensates, hydroxymethyl-substituted imidazolidinones, such as 1,3-dimethylol-4,5-dihydroxyimidazolidinone (4,5-dihydroxy-N,N'-dimethylolethyleneurea) or dihydroxymethyl ethyleneurea, dihydroxymethyl propyleneurea or dihydroxymethylurone, hydroxymethyl-substituted pyrimidinones or hydroxymethyl-substituted triazinones or thio derivatives thereof, self-condensation products thereof or mixed condensates of two or more of the compounds mentioned or a mixture of two or more of the compounds mentioned as the crosslinking resin.

A disadvantage of the prior art as cited above is in particular the fact that the described adhesives either do not meet water resistance standards (DIN EN 204 D3 or D4/5) or require low molecular weight polyaldehydes either in free from or, for example, as a bisulfite adduct as crosslinking agent. Problems arise out of the fact that the polyaldehydes mentioned or their adducts generally have a strong odor which can be troublesome or can even pose a health risk.

Accordingly, the problem addressed by the present invention was to provide a polymer dispersion which, in the form of the films produced from and, in particular, bonds established with the polymer dispersion, would show improved resistance to moisture or water, especially hot water, and which would not require the presence of free aldehydes or bisulfite adducts thereof.

This problem has been solved by a polymer dispersion containing water, an emulsion polymer, a protective colloid, a water-soluble acidic metal salt and a crosslinking resin.

BRIEF SUMMARY OF THE INVENTION

Accordingly, the present invention relates to a polymer dispersion containing water, at least one polymer produced by emulsion polymerization, at least one protective colloid, at least one water-soluble acidic metal salt and at least one crosslinking resin based on phenol/formaldehyde condensates, hydroxymethyl-substituted imidazol-idinones, hydroxymethyl-substituted pyrimidinones or hydroxymethyl-substituted triazinones, thio derivatives or self-condensation products thereof or mixed condensates of two or more of the compounds mentioned or a mixture of two or more of the compounds mentioned.

A "polymer dispersion" in the context of the present invention is understood to be a dispersion of particulate polymer particles in an aqueous phase. The size of the polymer particles is in the range typically encountered in emulsion polymerization processes. For example, it may be in the range from about 0.001 to about 100 μm or in the range from about 0.05 to about 20 μm and is preferably in the range from about 0.01 to 5 μm and more particularly in the range from about 0.01 to 2 μm.

The polymer dispersions according to the invention may contain water emanating from any source. For example, the water used in the polymer dispersions according to the invention may be tap water as generally available from corresponding supply sources. However, ground water, industrial water, process water or servers recovered in some other form from a circuit may equally well be used in the polymer dispersions according to the invention providing the pH value and the salt content allow stable polymer dispersions to be maintained.

Olefinically unsaturated monomers which lend themselves to emulsion polymerization are suitable for the production of the polymer dispersions according to the invention. Suitable polymers for the production of the dispersions according to the invention are, for example, vinyl ester polymers of which the basic monomeric unit is a vinyl ester of a linear or branched carboxylic acid containing about 2 to about 44 carbon atoms, for example about 3 to about 15 carbon atoms. Suitable monomers for these homopolymeric or copolymeric polyvinyl esters are vinyl formate, vinyl acetate, vinyl propionate, vinyl isobutyrate, vinyl pivalate, vinyl-2-ethyl hexanoate, vinyl esters of saturated branched monocarboxylic acids containing 9 to about 15 carbon atoms in the acid component, vinyl esters of relatively long-chain saturated or unsaturated fatty acids, such as vinyl laurate, vinyl stearate or vinyl esters of benzoic acid and substituted derivatives of benzoic acid, such as vinyl-p-tert.butyl benzoate. The vinyl esters mentioned may be present individually or in the form of mixtures of two or more of the vinyl esters mentioned in the polyvinyl ester. In a preferred embodiment of the invention, the vinyl esters may make up at least about 50% by weight, for example at least about 75% by weight, of the polymer as a whole.

In another preferred embodiment of the present invention, the polymer dispersion may also contain polymers which contain other comonomers besides one of the above-mentioned vinyl esters or a mixture of two or more of the above-mentioned vinyl esters. Other ethylenically unsaturated monomers which may be copolymerized with the above-mentioned vinyl esters are, for example, acrylic acid, methacrylic acid and esters thereof with primary and secondary, saturated monohydric alcohols containing 1 to about 28 carbon atoms, such as methanol, ethanol, propanol, butanol, 2-ethylhexyl alcohol, cycloaliphatic alcohols, such as cyclohexanol, hydroxymethyl cyclohexane or hydroxyethyl cyclohexane. The esters of the above-mentioned ethylenically unsaturated acids with relatively long-chain fatty alcohols are also suitable as comonomers, as are ethylenically unsaturated dicarboxylic acids, such as maleic acid, fumaric acid, itaconic acid or citraconic acid and mono- and diesters thereof with saturated, monohydric aliphatic alcohols containing 1 to about 28 carbon atoms. The percentage content of such comonomers in the polymers present in the polymer dispersion according to the invention may be up to about 25% by weight, for example from about 0.1 to about 15% by weight.

Other suitable comonomers are monoethylenically unsaturated hydrocarbons, such as ethylene or α-olefins containing about 3 to about 28 carbon atoms, for example propylene, butylene, styrene, vinyltoluene, vinyl xylene and halogenated unsaturated aliphatic hydrocarbons, such as vinyl chloride, vinyl fluoride, vinylidene chloride, vinylidene fluoride and the like. Comonomers such as these may make up as much as about 50% by weight or less, for example about 0.5 to about 25% by weight, of the polymers used in the dispersions according to the invention.

Other comonomers suitable for use in accordance with the present invention are, for example, polyethylenically unsaturated monomers, for example diallyl phthalates, diallyl maleate, triallyl cyanurate, tetraallyloxy ethane, divinylbenzene, butane-1,4-diol dimethacrylate, triethylene glycol dimethacrylate, divinyl adipate, allyl acrylate, allyl methacrylate, vinyl crotonate, methylene-bis-acrylamide, hexanediol diacrylate, pentaerythritol diacrylate or trimethylolpropane triacrylate or mixtures of two or more thereof. The percentage content of such comonomers in the polymers produced by emulsion polymerization present in the dispersions according to the invention is up to about 10% by weight, for example from about 0.01 to about 5% by weight.

Other suitable comonomers are ethylenically unsaturated compounds containing N-functional groups including, for example, acrylamide, methacrylamide, allyl carbamate, acrylonitrile, N-methylol acrylamide, N-methylol methacrylamide, N-methylol allyl carbamate and the N-methylol esters, alkyl ethers or Mannich bases of N-methylol acrylamide or N-methylol methacrylamide or N-methylol allyl carbamate, acrylamidoglycolic acid, acrylamidomethoxyacetic acid methyl ester, N-(2,2-dimethoxy-1-hydroxyethyl)-acrylamide, N-dimethylaminopropyl acrylamide, N-dimethylaminopropyl methacrylamide, N-methyl acrylamide, N-methyl methacrylamide, N-butyl acrylamide, N-butyl methacrylamide, N-cyclohexyl acrylamide, N-cyclohexyl methacrylamide, N-dodecyl acrylamide, N-dodecyl methacrylamide, ethyl imidazolidone methacrylate, N-vinyl formamide, N-vinyl pyrrolidone and the like.

Other organic polymers suitable for use in the production of the polymer dispersions according to the invention come from the group of styrene/butadiene rubbers (SBRs). Rubbers such as these are produced by copolymerization of styrene and butadiene and contain the two monomers in a ratio by weight of generally about 23.5:76.5 or about 40:60. The SBRs are normally produced by emulsion polymerization in water.

Another suitable group of polymers are the polyvinyl acetates (PVAc). Polyvinyl acetates are thermoplastic polymers of vinyl acetate. The polymerization is generally carried out by suspension or emulsion polymerization.

Another suitable group of polymers are polyethylene homo- and copolymers. A radical polymerization of ethylene is carried out, for example, by high-pressure polymerization to LDPE under pressures of about 1,400 to 3,500 bar and at temperatures of 150 to 350° C. The reaction is initiated by oxygen or peroxides. Suitable comonomers are linear or branched α,β-unsaturated olefins.

Another group of suitable polymers are the polyacrylates or methacrylates or copolymers of polyacrylates and polymethacrylates. The polymers mentioned may optionally contain small amounts (up to about 10%) of free acrylic acid or methacrylic acid groups.

Another suitable polymer is polyvinylidene chloride. This polymer is preferably obtained by emulsion polymerization of 1,1-dichloroethylene. Copolymers of 1,1-dichloroethylene with acrylates, methacrylates, vinyl chloride or acrylonitrile are particularly suitable.

Another suitable polymer is polyvinylidene fluoride. This polymer can be obtained by polymerization of vinylidene fluoride and can be adapted in its chemical and mechanical properties, for example by copolymerization with suitable monomers, such as ethylene, acrylonitrile, acrylate esters, methacrylate esters and the like.

Polyvinyl chlorides obtainable by emulsion polymerization (E-PVC) are also suitable.

According to the invention, the polymers mentioned may be used both individually and in the form of mixtures of two or more thereof in the polymer dispersion according to the invention.

In a preferred embodiment of the invention, a copolymer of vinyl acetate and ethylene (EVA copolymer) is used as the organic polymer. In another preferred embodiment of the invention, the polymer dispersion contains polyvinyl acetate or polyacrylate, more particularly polybutyl acrylate or a mixture of polyvinyl acetate and polyacrylate.

The polymer dispersion according to the invention contains the above-mentioned polymers obtainable by emulsion polymerization in a quantity of at least about 30% by weight. In a preferred embodiment of the present invention, the percentage content of such polymers is at least about 35 or at least about 40% by weight. However, it may be even higher, for example at least about 45% by weight or at least about 55 or at least about 60% by weight.

Besides the above-mentioned organic polymers obtainable by emulsion polymerization, the polymer dispersion according to the invention contains at least one protective colloid or a mixture of two or more protective colloids. Suitable protective colloids are, for example, etherified cellulose derivatives, such as hydroxyethyl cellulose, hydroxypropyl cellulose or carboxymethyl cellulose. Also suitable are polyvinyl pyrrolidone or polycarboxylic acids, such as polyacrylic acid or polymethacrylic acid, optionally in the form of their copolymers with optionally OH-group-containing esters of acrylic or methacrylic acid, and copolymers of maleic acid or maleic anhydride with other ethylenically unsaturated compounds, such as methyl vinyl ether or styrene. In a preferred embodiment of the present invention, however, polyvinyl alcohol, for example polyvinyl alcohol with a degree of hydrolysis of about 30 to about 100% by weight, for example about 60 to about 98% by weight or about 70 to about 88% by weight, or a mixture of two or more such polyvinyl alcohols is used as protective colloid. The protective colloids used in accordance with the invention in the polymer dispersions according to the invention may be used individually, as described above. However, a mixture of two or more of the protective colloids mentioned may equally well be used in accordance with the invention.

In a preferred embodiment of the present invention, the polymer dispersion contains an OH-group-containing protective colloid. In another preferred embodiment of the present invention, the polymer dispersion contains polyvinyl alcohol as protective colloid.

The protective colloid(s) make up about 0.1 to about 20% by weight, for example about 0.5 to about 15 or about 1 to about 10% by weight of the polymer dispersion according to the invention as a whole.

The polymer dispersion according to the invention contains a water-soluble acidic metal salt. Suitable salts are, for example, the nitrates, chlorides, oxychlorides or sulfates of aluminium, iron, chromium, titanium, zirconium or vanadium. A preferred embodiment of the invention is characterized by the use of, in particular, the salts of aluminium, chromium or zirconium, for example aluminium chloride, aluminium nitrate, chromium chloride or zirconium oxychloride. According to the invention, the acidic metal salts mentioned may be used individually or in the form of a mixture of two or more thereof.

The corresponding salts are used in a quantity of about 0.05 to about 20% by weight, based on the polymer dispersion as a whole, for example in a quantity of about 0.1 to about 10% by weight or about 0.2 to about 5% by weight. A solution of the corresponding metal salts is advantageously stirred into the polymer dispersion.

In a preferred embodiment of the present invention, the corresponding metal salts or a mixture of two or more of the corresponding metal salts is added in such a quantity that the pH of the polymer dispersion is about 1 to about 5. In another preferred embodiment of the invention, the pH value of the polymer dispersion is about 2 to about 4.

If the pH of the polymer dispersion is to remain stable, even for long periods, it has proved to be of advantage to add a buffer system to the polymer dispersion. Suitable buffer systems for the dispersion are, for example,
carbonate/hydrogen carbonate,
sodium acetate/acetic acid,
monopotassium citrate ($KH_2$ citrate),
monosodium phosphate/citric acid.

Besides the constituents already mentioned, the polymer dispersion according to the invention also contains a crosslinking resin or a mixture of two or more crosslinking resins. The crosslinking resins used in accordance with the invention are either phenol/formaldehyde resins or 1,3-dimethylol-4,5-dihydroxyimidazolidone (4,5-dihydroxy-N,N'-dimethylolethyleneurea) or dihydroxymethyl ethyleneurea, dihydroxymethyl propyleneurea or dihydroxymethylurone or thio derivatives or self-condensation products thereof or a mixture of two or more thereof.

Suitable phenol/formaldehyde resins can be obtained by reacting phenol or phenol derivatives and formaldehyde or formaldehyde derivatives together with an increase in molecular weight. The production of such phenol/formaldehyde resins follows the general rules of inorganic chemistry and is known to the expert. In a preferred embodiment of the invention, phenol/formaldehyde resins suitable for the purposes of the invention have a softening point (ring-and-ball) after crosslinking of about 80 to about 130° C., for example in the range from about 90 to about 120° C.

Phenol/formaldehyde resins suitable for the purposes of the invention contain OH groups at the aromatic phenol units. A preferred embodiment of the invention is characterized by the use of phenol/formaldehyde resins which have an OH value of 100 or less, for example about 80, about 60 or about 40 or less, for example about 20 or about 10. In another preferred embodiment of the invention, the phenol/formaldehyde resins used contain less than 10% by weight of free methyl groups, for example less than 8% by weight, less than 6% by weight or less than 4% by weight or less. Suitable phenol/formaldehyde resins are self-dispersible in water and, as a dispersion, are stable for long periods, for example of 4 weeks or more.

According to the invention, it is also possible to use phenol/formaldehyde resins of which the phenol units are substituted in the p-position to the OH group. Suitable substituents are, for example, linear or branched, saturated or unsaturated alkyl chains with 1 to about 22 carbon atoms.

The phenol/formaldehyde resins suitable for the purposes of the invention are normally marketed as aqueous emulsions with a solids content of up to about 60% by weight. Another preferred embodiment of the present invention is characterized by the use of emulsions which have a viscosity of about 50 to about 100 poises at a pH value of about 6.5 to about 7.5 for a solids content of about 45 to 55% by weight. Suitable phenol/formaldehyde resins are obtainable, for example, as Resin XR 14277 A (manufacturer: CECA/ELF-Atochem) which is an aqueous emulsion of a reactive phenolic resin with a small content of free formaldehyde (less than 0.1%). It is a milky white to pale yellowish colored product with a viscosity of 60 to 80 poises at a pH of 7 to 7.5 and a solids content of 49 to 52% by weight.

Other suitable crosslinking resins are crosslinking resins of the HRJ and SP type (for example SP-8025) marketed by Schenectady International, more particularly the following resins:
HRJ-11112 (terpene/phenol base) with a Brookfield viscosity of 300 to 750, a particle size of about 0.5 to about 3.0 µm, a solids content of about 39 to about 47% and a pH value of about 9 to 10 and
HRJ-10416 (alkyd/phenol base) with a Brookfield viscosity of 1200 to 2750, a particle size of about 1.0 to about 5.0 µm, a solids content of about 51 to about 57% and a pH value of about 4.5 to 6.5.

Other suitable crosslinking resins are based on hydroxymethyl-substituted imidazolidinones, such as 1,3-dimethylol-4,5-dihydroxyimidazolidinone (4,5-dihydroxy-N,N'-dimethylolethyleneurea), hydroxymethyl-substituted pyrimidinones or hydroxymethyl-substituted triazinones or self-condensation products thereof or mixed condensates of two or more of the compounds mentioned or a mixture of two or more of the compounds mentioned. Crosslinking resins of the type in question are commercially available, for example, under the names of Fixapret, Stabitex, Permafresh, Sarcoset, Sumitex, Prox, Knittex, Cassurit, Neuperm or Depremol.

In another embodiment of the present invention, compounds of the Fixapret series, for example Fixapret C-PX, Fixapret COC, Fixapret CP 40 IGD, Fixapret CPK IGD, Fixapret CPNS IGD, Fixapret CP IGD or Fixapret CPN IGD, are used as crosslinking resins. The compounds mentioned are normally used in the form of aqueous emulsions or solutions with a solids content of about 30 to about 50% by weight. In a preferred embodiment, the pH value is about 7.5 to about 9.

Fixapret C-PX is a polycondensation product of glyoxal/urea/formaldehyde (dimethyl glyoxal urein) in water with a pH value of 8.0 to 8.5, a solids content of 40 to 42% by weight, a free formaldehyde content of less than 1.1% by weight, a density of 1.03 to 1.06 g/cm$^3$ and an Apha color value of at most 50 which does not cause any precipitation in the presence of MgCl.

In another preferred embodiment of the invention, the polymer dispersion contains a crosslinking resin based on 1,3-dimethylol-4,5-dihydroxyimidazolidinone (4,5-dihydroxy-N,N'-dimethylolethyleneurea) either in the form of the pure compounds, self-condensation products thereof or mixtures thereof.

Other suitable crosslinking resins are commercially obtainable in the product series marketed, for example, under the name of Stabitex (manufacturer: BASF). Basically, any of the products marketed under the above-mentioned name may be used. In a preferred embodiment of the invention, however, Stabitex ZF or Stabitex GFA is used as the crosslinking resin. The compounds mentioned are normally used as aqueous emulsions or solutions with a solids content of from about 30 to about 50% by weight. In a preferred embodiment, the pH is in the range from about 7.5 to about 9.

The polymer dispersions according to the invention contain the crosslinking resins in a quantity of about 0.01 to about 5% by weight, for example in a quantity of 0.05 to about 4% by weight or 0.1 to about 3% by weight. Within this range, quantities of, for example, about 0.5 to about 2 or 0.8 to about 1.5% by weight are particularly suitable.

In another preferred embodiment of the invention, the dispersion may also contain at least one ionic surfactant. In another preferred embodiment of the invention, this ionic surfactant has a molecular weight of less than about 600.

Anionic, cationic or ampholytic surfactants or mixtures of two or more thereof may be present. Examples of suitable anionic surfactants are alkyl sulfates, particularly those with a chain length of about 8 to about 18 carbon atoms, alkyl and alkaryl ether sulfates containing about 8 to about 18 carbon atoms in the hydrophobic part and 1 to about 10 ethylene oxide (EO) or propylene oxide (PO) units or a mixture thereof in the hydrophilic part of the molecule, sulfonates, more particularly alkyl sulfonates containing about 8 to about 18 carbon atoms, alkyl aryl sulfonates containing about 8 to about 18 carbon atoms, taurides, esters and semiesters of sulfosuccinic acid with monohydric alcohols or alkylphenols containing 4 to about 15 carbon atoms which may optionally be ethoxylated with 1 to about 20 EO units, alkali metal and ammonium salts of carboxylic acids, for example of fatty acids or resin acids containing about 8 to about 32 carbon atoms or mixtures thereof, phosphoric acid partial esters and alkali metal and ammonium salts thereof.

In a preferred embodiment of the invention, alkyl and alkaryl phosphates containing about 8 to about 22 carbon atoms in the organic residue, alkylether or alkaryl ether phosphates containing about 8 to about 22 carbon atoms in the alkyl or alkaryl group and 1 to about 10 EO units are used as anionic surfactants.

Examples of cationic surfactants are salts of primary, secondary or tertiary fatty amines containing about 8 to about 24 carbon atoms with acetic acid, sulfuric acid, hydrochloric acid or phosphoric acids, quaternary alkyl and alkylbenzene ammonium salts, particularly those of which the alkyl groups contain about 6 to about 24 carbon atoms, especially the halides, sulfates, phosphates or acetates, or mixtures of two or more thereof, alkyl pyridinium, alkyl imidazolinium or alkyl oxazolidinium salts, particularly those of which the alkyl chain contains up to about 18 carbon atoms, for example the halides, sulfates, phosphates or acetates or mixtures of two or more thereof.

Examples of ampholytic surfactants are long-chain substituted amino acids, such as N-alkyl di(aminoethyl)glycine or N-alkyl-2-aminopropionic acid salts, betaines, such as N-(3-acylamidopropyl)-N,N-dimethyl ammonium salts with a $C_{8-18}$ acyl group or alkyl imidazolium betaines.

Another preferred embodiment of the present invention is characterized by the use of the following anionic surfactants; the alkali metal salts, more particularly the Na salt, of $C_{12/14}$ fatty alcohol ether sulfates, alkylphenol ether sulfates, more particularly alkali metal or ammonium salts thereof, sodium n-dodecyl sulfate, dipotassium oleic acid sulfonate ($C_{18}$), sodium n-alkyl-($C_{10-13}$)-benzenesulfonate, sodium 2-ethylhexyl sulfate, ammonium lauryl sulfate ($C_{8/14}$), sodium lauryl sulfate ($C_{12/14}$), sodium lauryl sulfate ($C_{12/18}$), sodium cetyl stearyl sulfate ($C_{16/18}$), sodium oleyl cetyl sulfate ($C_{16/18}$), sulfosuccinic acid monoester disodium salt, fatty alcohol sulfosuccinate disodium salt, dialkyl sulfosuccinate sodium salt or disodium sulfosuccinamate or mixtures of two or more thereof.

Where the polymer dispersion according to the invention contains ionic surfactants, they are preferably present in a quantity of up to about 1% by weight or less, for example up to about 0.8% by weight or about 0.5% by weight or less, based on the dispersion as a whole. Relatively small quantities of ionic surfactant, for example up to about 0.2% by weight or less, for example about 0.1% by weight, 0.05% by weight or 0.02% by weight, may also be present.

In another preferred embodiment, the filler-containing polymer dispersion may contain at least one nonionic surfactant with a molecular weight of less than about 600.

Examples of nonionic surfactants are alkyl polyglycol ethers, preferably those containing about 8 to about 20 EO units and alkyl groups with about 8 to about 20 carbon atoms, alkylaryl polyglycol ethers, preferably those containing about 8 to about 40 EO units and about 8 to about 20 carbon atoms in the alkyl or aryl groups, ethylene oxide/propylene oxide (EO/PO) block copolymers, preferably those containing about 8 to about 40 EO units and the same number of PO units, addition products of alkyl amines containing alkyl groups with about 8 to about 22 carbon atoms with ethylene oxide or propylene oxide, fatty and resin acids containing about 6 to about 32 carbon atoms, alkyl polyglycosides with linear or branched, saturated or unsaturated alkyl groups containing on average about 8 to about 24 carbon atoms and an oligoglycoside group containing about 1 to about 10 hexose or pentose units on average or mixtures of two or more thereof, natural substances and derivatives thereof, such as lecithin, lanolin or sarcosine, linear organo(poly)siloxanes containing polar groups, more particularly those containing alkoxy groups with up to about 10 carbon atoms and up to about 20 EO or PO groups.

Suitable nonionic surfactants are, for example, nonylphenol ethoxylates, octylphenol ethoxylates, $C_{12/14}$ fatty alcohol ethoxylates, oleyl cetyl ethoxylates, $C_{16/18}$ fatty alcohol ethoxylates, cetyl stearyl ethoxylates, ethoxylated triglycerides, sorbitan monolaurate, sorbitan monooleate, sorbitan-20EO-monooleate, sorbitan-20EO-monostearate or a mixture of two or more thereof.

In another preferred embodiment of the present invention, the dispersion according to the invention contains—for example in addition to or instead of a buffer system—one or more compounds capable of reacting with a strong mineral acid such as can be released, for example, during the use of the acidic metal salts for the purposes of the present invention which are neutralized in the process. Suitable compounds of this type are, for example, amines which can be protonated by reaction with a mineral acid. Suitable amines are, for example, primary, secondary or tertiary amines which may optionally contain one or more functional groups. Amines with one or more OH functionalities, for example ethanolamine, diethanolamine or more particularly triethanolamine, are particularly suitable. Compounds containing at least one epoxy group are also suitable for this purpose.

For example, epoxidized natural fats or fatty acids of the type marketed, for example, by Henkel KGaA under the name of Edenol® are particularly suitable for this purpose. For example, the products Edenol D81, Edenol D82 and Edenol D83 which are characterized in the following Table are particularly suitable:

|  | Edenol D 81 | Edenol D 82 | Edenol D 83 |
| --- | --- | --- | --- |
| Oxirane content | 6.3–7.0% | 6.5–7.0 | 6.5–7.0% |
| Acid point | 0.0–0.5 | 0.0–0.3 | 0.0–0.3 |
| Iodine value | 0.0–5 | 0.0–2.5 | 0.0–2.5 |
| Refractive index, 20° C. | 1.472–1.474 | 1.472–1.474 | 1.472–1.474 |

In another preferred embodiment of the invention, the dispersion contains up to about 30% by weight, based on the dispersion as a whole, of additives. The additives include, for example, stabilizers, defoamers, antioxidants, photostabilizers, pigment dispersants, fillers, pH adjusters, plasticizers and the like.

Suitable plasticizers are, for example, esters, such as abietic acid ester, adipic acid ester, azelaic acid ester, benzoic acid ester, butyric acid ester, acetic acid ester, esters of higher fatty acids containing about 8 to about 44 carbon atoms, esters of OH-functional or epoxidized fatty acids, fatty acid esters and fats, glycolic acid esters, phosphoric acid esters, phthalic acid esters, linear or branched alcohols containing 1 to 12 carbon atoms, propionic acid esters, sebacic acid esters, sulfonic acid esters, thiobutyric acid esters, trimellitic acid esters, citric acid esters and mixtures of two or more thereof. The asymmetrical esters of dibasic aliphatic dicarboxylic acids, for example the esterification product of adipic acid monooctyl ester with 2-ethyl hexanol (Edenol DOA, a product of Henkel KGaA, Düsseldorf), are particularly suitable.

Other suitable plasticizers are the pure or mixed ethers of monohydric, linear or branched $C_{4-16}$ alcohols or mixtures of two or more different ethers of such alcohols, for example dioctyl ethers (obtainable as Cetiol OE from Henkel KGaA, Düsseldorf).

In another preferred embodiment, end-capped polyethylene glycols, for example polyethylene or polypropylene glycol di-$C_{1-4}$-alkyl ethers, more particularly the dimethyl or diethyl ethers of diethylene glycol or dipropylene glycol and mixtures of two or more thereof, are used as plasticizers.

If it is to be used as an adhesive, the preparation according to the invention may contain up to about 10% by weight of typical tackifiers. Suitable tackifiers are, for example, resins, terpene oligomers, coumarone/indene resins, aliphatic petrochemical resins and modified phenolic resins.

The preparation according to the invention may contain up to about 2% by weight and preferably about 1% by weight of UV stabilizers. Particularly suitable UV stabilizers are the so-called hindered amine light stabilizers (HALS).

In another preferred embodiment of the invention, the polymer dispersion contains about 30 to 70% by weight of a polymer obtainable by emulsion polymerization or a mixture of two or more thereof,
0.5 to 15% by weight of a protective colloid or a mixture of two or more protective colloids,
0.05 to 20% by weight of a water-soluble acidic metal salt or a mixture of two or more thereof,
0.01 to 5% by weight of a crosslinking resin or a mixture of two or more thereof,
29.44 to 79.44% by weight of water,
0 to 0.5% by weight of a nonionic surfactant,
0 to 0.1% by weight of an ionic surfactant and
0 to 30% by weight of other additives.

In one preferred embodiment of the present invention, the filler-containing polymer dispersion is prepared by emulsion polymerization. In the context of the present invention, "emulsion polymerization" is understood to be a polymerization process in which monomers insoluble or poorly soluble in water are emulsified in water using emulsifiers and polymerized using water-soluble initiators. Suitable emulsion polymerization processes are described, for example, in Comprehensive Polymer Chemistry, 4, 171–218, Elias (5th Edition), 2, 93 et seq; in Encyclopaedia of Polymer Science and Engineering, 12, 512 et seq and in Encyclopaedia of Polymer Science and Technology, 5, 801 et seq. Other suitable references are known, for example, from the reference books known to the expert, Ullmann's Enzyklopädie der technischen Chemie, Houben-Weyl (E20, 218–268) or Kirk-Othmer. Reference is hereby expressly made to the cited literature references, the disclosures of those references being regarded as part of the disclosure of the present specification.

Polymerization initiators suitable for use in the production of the polymer dispersions according to the invention are both water-soluble and oil-soluble polymerization initiators. Particularly suitable polymerization initiators are water-soluble initiators, such as tert.butyl hydroperoxide, sodium peroxodisulfate, peroxodisulfuric acid, cumene hydroperoxide, azo compounds, such as diazoisobutyrodinitrile or benzoyl peroxide. Redox initiators, i.e. systems consisting of oxidizing and reducing agents, are also suitable. In many cases, water-soluble redox initiators contain transition metals, for example Fe/HO (I), although other basic components, for example the systems peroxysulfates/metabisulfates, peroxysulfates/thiosulfates or peroxides/thiosulfates, may also be used.

In one preferred embodiment of the invention, sodium persulfate, potassium persulfate or ammonium persulfate is used as the polymerization initiator.

According to the invention, the quantity of polymerization initiator used is generally between about 0.01 and about 0.5% by weight, based on the dispersion as a whole. In one preferred embodiment of the invention, the total amount of polymerization initiator used is between about 0.03 and about 0.2% by weight, for example between about 0.05 and about 0.15% by weight.

According to the invention, the total quantity of polymerization initiator may be present in the dispersion of the filler particles at the beginning of the polymerization process. In one preferred embodiment of the invention, however, the polymerization initiator is added in at least two batches at different stages of the polymerization reaction. For example, part of the total quantity of polymerization initiator may be added before the monomer(s), the remainder being added in portions or continuously during or after addition of the monomer(s).

The other constituents present in the polymer dispersions, for example protective colloids, surfactants and additives may be added before, during or after the emulsion polymerization.

The crosslinking resins may also be added before, during or after the emulsion polymerization. In a preferred embodiment of the invention, however, the crosslinking resins are added before or during the polymerization process. They may be added, for example, shortly before or at the beginning of the polymerization reaction. It has been found that the addition of the crosslinking resin before or during the polymerization process leads to products which have a longer shelf life at high temperatures, for example at about 30 to about 50° C., than products where the crosslinking resin was added after the polymerization reaction.

In another preferred embodiment of the present invention, the water-soluble acidic salts are added to the dispersion after the emulsion polymerization.

In another preferred embodiment of the invention, the crosslinking resins are added before the acidic metal salts.

Accordingly, the present invention also relates to a process for the production of a polymer dispersion containing water, a polymer obtainable by emulsion polymerization, a protective colloid, a water-soluble acidic metal salt and at least one crosslinking resin, characterized in that a crosslinking resin based on hydroxymethyl-substituted imidazolidinones, hydroxymethyl-substituted pyrimidinones or hydroxymethyl-substituted triazinones or self-condensation products thereof or mixed condensates of two or more of the compounds mentioned or a mixture of two or more of the compounds mentioned is added to the reaction mixture before, during or after an emulsion polymerization reaction for the production of a polymer obtainable by emulsion polymerization.

In a preferred embodiment of the invention, 1,3-dimethylol-4,5-dihydroxyimidazozlidinone (4,5-dihydroxy-N,N'-dimethylolethyleneurea) or dihydroxymethyl ethyleneurea, dihydroxymethyl propyleneurea or dihydroxymethyl urone or thio derivatives thereof either in the form of respective compounds mentioned, self-condensation products thereof or mixed condensates of two or more of the compounds mentioned or condensates are added as the crosslinking resins.

In another preferred embodiment of the invention, the crosslinking resin is added before or during the polymerization reaction.

In a preferred embodiment of the invention, the emulsion polymerization is carried out in the presence of a protective colloid or a mixture of two or more protective colloids.

The polymer dispersions according to the invention are suitable for the surface coating or bonding of like or different substrates, substrates with a smooth surface and substrates with rough or porous surfaces being coatable or bondable with the polymer dispersions. In a preferred embodiment of the present invention, the polymer dispersions according to the invention are used for the coating or bonding of substrates based on natural raw materials, for example for the bonding of wood, paper or paperboard.

Accordingly, the present invention also relates to the use of the polymer dispersions according to the invention in adhesives or surface coating compositions, such as lacquers, emulsions paints, glues, adhesives or other surface coatings.

The present invention therefore also relates to an adhesive or a surface coating composition containing a polymer dispersion according to the invention or a polymer dispersion produced by the process according to the invention.

The invention is illustrated by the following Examples.

EXAMPLES

Example 1

D-3 Product 0.5 g of Fixapret COC (manufacturer: BASF) was added to, and stirred for 15 minutes with, 100 kg of a polyvinyl acetate emulsion with a solids content of about 55% by weight, 3.8% by weight of polyvinyl alcohol and a viscosity of 15,000 cps. 1 kg of dibutyl phthalate and 1.1 kg of a polyglycol ether were then added to the emulsion followed by stirring for another 20 minutes. The emulsion was adjusted to pH 2.8 by addition of 1.2 kg of aluminium trichloride. 0.2 kg of a buffer was then added to stabilize the pH value. Finally, the viscosity of the dispersion was adjusted to 4,000 cps by addition of 30 kg of water. A final viscosity of 3950 cps was obtained. A bond established with this polymer dispersion satisfied the requirements of DIN EN 204 in regard to stress group D3.

Mowioll 26/88 (manufacturer: Clariant) which has a degree of hydrolysis of 88% was used as the polyvinyl alcohol.

The viscosity measurements were carried out with a Brookfield RVF viscosimeter (spindle 5, speed 20) at 23° C. Polysolvan 0 (manufacturer: Celanese GmbH) was used as the polyglycol ether. It is the butyl ester of glycolic acid (molecular formula $C_6H_{12}O_2$) which has a density of 1.015 to 1.023 g/cm$^3$, an index $n_D$ of 1.423 to 1.426, a viscosity of 4.62 mPas and a maximum water content of 8%.

The buffer solution used to stabilize the pH was prepared as follows: 16.32 g of sodium acetate and 22.24 g of acetic acid were dissolved in 200 g of water and 0.2 kg of the resulting solution was added to the described dispersion.

Example 2

D-4 Product prepared with a phenol/formaldehyde resin (Resin XR 14227 A) in aqueous emulsion.

The emulsion has a pH value of 7 to 7.5, a solids content of 49 to 52% by weight, a free formaldehyde content of less than 0.1% by weight and a viscosity of 60 to 80 poises at 20° C.

0.5 kg of Resin XR 14277 A (manufacturer: Ceca/Elf-Atochem) was added to and stirred for 15 minutes with 100 kg of a polyvinyl acetate emulsion with a solids content of about 55% by weight, 3.8% by weight of polyvinyl alcohol and a viscosity of 15,000 cps. 1 kg of dibutyl phthalate and 1.1 kg of a polyglycol ether were then added to the emulsion followed by stirring for another 20 minutes. The emulsion was adjusted to pH 2.8 by addition of 1.2 kg of aluminium trichloride. 0.2 kg of a buffer was then added to stabilize the pH value. Finally, 15 kg of water were added to and homogenized with the emulsion for viscosity adjustment. The final viscosity—measured under the same conditions as in Example 1—was 5,200 cps. A bond established with this polymer dispersion satisfied the requirements of DIN EN 204 in regard to stress group D4.

In comparison tests, the properties mentioned below were measured for the following adhesives:
product 1: the product of Example 1
product 2: a product similar to D-2
product 3: a commercial adhesive with no crosslinker The following properties were measured:
open time so that the drying rate (paper on a 100 μm film) is determined,
setting time so that the bonding rate (of paper to a 60 μm adhesive film on glass) is determined,
early strength after 15 minutes (bonding of wood samples) and
24-hour strength (bonding of wood samples).
The following values were obtained:

|  | Product 1 | Product 2 | Product 3 |
|---|---|---|---|
| Open time, mins. | 6 | 8–9 | 10–12 |
| Setting time, seconds | 8–10 | 12–15 | 14–16 |
| Early strength, kg/cm$^2$ | 95 | 90 | 80 |
| 24-Hour strength, kg/cm$^2$ | 115 | 110 | 110 |

DETAILED DESCRIPTION OF THE INVENTION

Exampl 3

D-3 Product with Acid Regulator 0.5 kg of Fixapret COC (manufacturer: BASF) was added to and mixed for 15 minutes with 100 kg of a polyvinyl acetate emulsion with a viscosity of 15,000 cps, a solids content of 55% and a polyvinyl alcohol content of 3.8% by weight. 2.2 kg of dibutyl phthalate were then added to the emulsion followed by stirring for another 20 minutes. After the addition of 1.2 kg of AlCl$_3$, the emulsion had a pH of 2.8. 0.8 kg of Edenol D-82 was then added. The viscosity of the dispersion was then adjusted to a value of 4,000 cps. An adhesive thus produced satisfied the requirements of EN 204–205 with regard to stress group D3.

Example 4

D-3 Product with Diallyl Phthalate 0.2 g of defoamer and 12 g of Fixapret COC were added to and mixed with a solution of 47 g of polyvinyl alcohol in 600 g of water. The mixture was heated to about 80° C. About 90% of a catalyst solution of 1.3 g of ammonium persulfate in 6 g of water were then added and the mixture was homogenized for about 5 minutes. A mixture of 460 g of vinyl acetate and 10 g of dibutyl phthalate was then added over a period of about 3.5 to 4 hours so that the temperature stayed between 82 and 88° C. After the monomer mixture had been added, the remaining catalyst solution was added and the reaction mixture was stirred for about 1 hour at a temperature of about 90° C. The solids content was then adjusted to about 55%. After the dispersion had cooled to a temperature of about 35 to about 40° C., 15 g of dibutyl phthalate were added. The product thus obtained had a pH of 4.2 and a viscosity (5/2120) of 44,000 cps.

Example 5

D-4 Product 10 kg of HRJ-10416 were added to 100 kg of the dispersion of Example 4 and the mixture was homogenized for 15 minutes. 3 kg of hexanol were then added and the mixture homogenized for another 20 minutes. After the addition of 1.2 kg of AlCl$_3$, the pH value was 3.2. The dispersion was adjusted to a viscosity of 4,000 cps by addition of water. A bond established with this adhesive had a resistance to boiling water of 6 hours.

Examples 6–9

D-3 Products

A polymer dispersion was first prepared. To this end, a starter solution and a monomer dispersion were continuously added to a preliminary solution consisting of 32 parts by weight of water, 5 parts by weight of polyvinyl alcohol, 0.1 part by weight of sodium hydrogen carbonate and 0.1 part by weight of sodium disulfite.

The starter solution contained 5 parts by weight of water and 0.1 part by weight of ammonium peroxysulfate. The monomer emulsion contained 11 parts of water, 41 parts of vinyl acetate, 0.5 part by weight of Disponil A 3065 (emulsifier), 0.05 part by weight of sodium hydrogen carbonate and, where present, 5 parts by weight of the particular comonomer indicated in Table 1.

The starter solution and the monomer emulsion were continuously added to the preliminary solution at a temperature of at most 85° C. The additives shown in Table 1 were then added to the dispersions obtained to form the dispersions according to the invention.

TABLE 1

Composition of the dispersions according to the invention

|  | Example 6 | Example 7 | Example 8 | Example 9 |
|---|---|---|---|---|
| Basic dispersion | Vac/NMA copolymer | Vac/NMA copolymer | Vac homopolymer | Vac homopolymer |
| Additives in %, based on dispersion as a whole | | | | |
| AlCl$_3$.6H$_2$O | 2.0 | 2.0 | 2.0 | 2.0 |
| Plasticizer | 2.0 | 2.0 | 2.0 | 2.0 |
| Defoamer | 0.1 | 0.1 | 0.1 | 0.1 |
| Triethanolamine | 0.5 | 0.5 | 0.5 | 0.5 |
| Sodium hydroxide | 0.1 | 0.1 | 0.1 | 0.1 |
| Stabitex GFA | 1.0 | 2.0 | 2.0 | 4.0 |

The invention claimed is:

1. A polymer dispersion comprising water, at least one polymer produced by emulsion polymerization, at least one protective colloid, at least one water-soluble acidic metal salt, and at least one crosslinking resin based on one or more components selected from the group consisting of hydroxymethyl-substituted imidazolidinones, hydroxymethyl-substituted thioimidazolidinones, hydroxymethyl-substituted pyrimidinones, hydroxymethyl-substituted triazinones, thio derivatives thereof, self-condensation products thereof, mixed condensates thereof, and mixtures thereof.

2. The polymer dispersion of claim 1, having a pH of 1 to 5.

3. The polymer dispersion of claim 1, wherein the water-soluble acidic metal salt comprises an aluminum, chromium, or zirconium salt.

4. The polymer dispersion of claim 1, wherein the protective colloid bears one or more OH-groups.

5. The polymer dispersion of claim 1, comprising at least 50% by weight of the at least one polymer produced by emulsion polymerization.

* * * * *